Feb. 17, 1931.  K. C. HAMER ET AL  1,792,690
DEVICE FOR USE WITH FILM REELS TO PREVENT BINDING
OF THE FILM UPON THE REEL FLANGES
Filed April 29, 1929  2 Sheets-Sheet 1
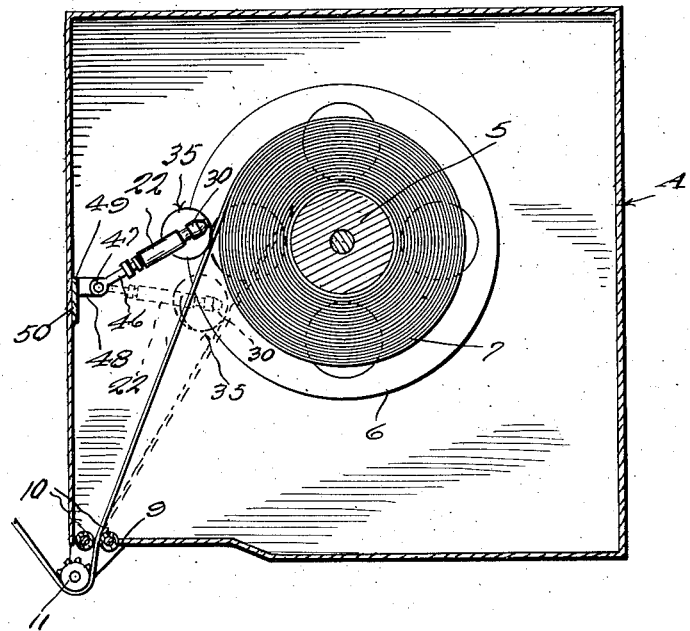
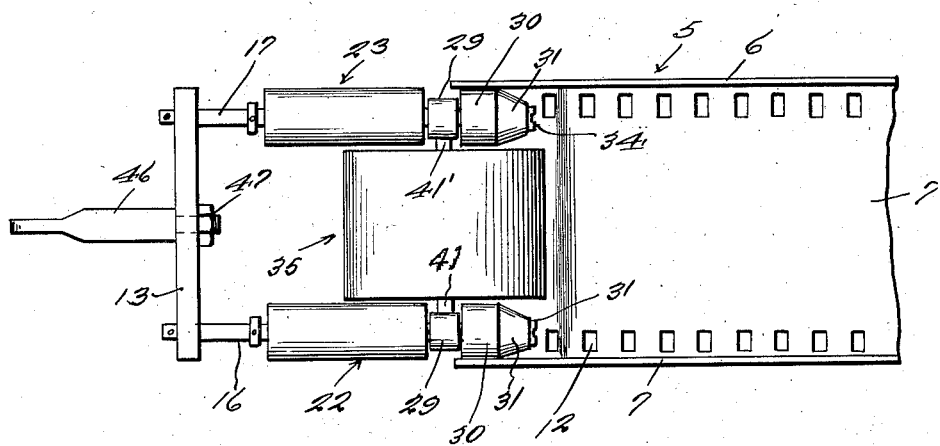
Inventor
Kenneth C. Hamer
Clark W. Rodger
By Clarence A. O'Brien
Attorney Feb. 17, 1931. K. C. HAMER ET AL 1,792,690
DEVICE FOR USE WITH FILM REELS TO PREVENT BINDING
OF THE FILM UPON THE REEL FLANGES
Filed April 29, 1929 2 Sheets-Sheet 2

Inventor
Kenneth C. Hamer
Clark W. Rodger

By Clarence A. O'Brien
Attorney

Patented Feb. 17, 1931

1,792,690

UNITED STATES PATENT OFFICE

KENNETH C. HAMER AND CLARK W. RODGERS, OF HOOVERSVILLE, PENNSYLVANIA

DEVICE FOR USE WITH FILM REELS TO PREVENT BINDING OF THE FILM UPON THE REEL FLANGES

Application filed April 29, 1929. Serial No. 359,071.

This invention relates to a device for use in conjunction with reels upon which films are rolled, whereby any distortion in the flange of the reel may be quickly and easily overcome during the rotation of the reel for feeding the film to the projecting apparatus of a motion picture machine.

Another very important object of the invention is to provide a means to prevent tearing or otherwise disfiguring the film during the unwinding process of the film upon the film reel, as is very often the case when the flanges of the reel become bent or otherwise distorted during transportation.

Other objects and advantages of our invention will be disclosed more in detail, as the description proceeds and from a study of the description taken in connection with the accompanying drawings, wherein:

Figure 1 is a sectional view taken through the film housing of a motion picture machine, showing a film reel and film therein, and having my invention applied thereto.

Figure 2 is a fragmentary view of a film reel, and film wound thereon and showing the association of my invention therewith.

Figure 3 is a detail sectional view of the invention per se.

Figure 4 is a sectional view taken on line 4—4 of Figure 3.

Figure 5 is a sectional view taken on line 5—5 of Figure 3.

Figure 6 is a plan view of one of the roller axles.

Referring in detail to the drawings, it will be seen that the film reel is designated generally by the reference character 5, and that the said reel comprises the usual flanges 6 and 7, respectively, as is the conventional structure in reels of this character. Suitably rolled upon the reel is the film 7, and as illustrated in Figure 1 in actual practice the reel is journaled within a housing A, and the film fed from the reel through a suitable opening 9, between guide rollers 10, through the medium of the toothed roller 11, the teeth of which roller engage in the openings 12 formed on the marginal edges of the film in a manner well known in the art.

It is well known that the films are wound about the reel, and that during transportation of the same from one place to another, the flanges of the reel become dented and otherwise disfigured, with the result that during the feeding operation of the film from the reel the film becomes engaged with the indented or bent portions of the flange of the reel, thus resulting in the tearing or breaking of the film and otherwise ruining the film and retarding the proper feeding of the film from the reel. It is therefore the purpose of this invention to provide a means whereby the bent flanges of the reel may be somewhat straightened during rotation of the reel when feeding the film, so as to prevent the film from coming in contact with the disfigured portions of the flanges and thus permitting a steady and spaced feeding process of the film. To this end then our invention per se comprises a flat elongated bar 13, and this bar 13 is apertured as at 14 and 15, respectively. The bar 13 may of course be formed of wood or metal as desired. A pair of arms 16 and 17 respectively, extend from the bar 13 in substantially spaced parallelism and are secured thereto in a manner to be presently described.

Each of the arms 16 and 17 are formed of an elongated piece of metal or wood as desired, and each of said arms is provided at one end with a reduced extremity 18 and 19 respectively. The reduced extremities of each of the arms are loosely received in the respective apertures 14 and 15, on the bar 13 as shown in Figure 3, and are held in place by means of pins 20 and 21, extending through the extremities of the reduced portion of the arms. It is to be understood that the arms are to be formed so as to provide suitable axles for the respective rollers rotatably mounted thereon as illustrated. Consequently, the arms are rounded throughout their length, and as before mentioned, rollers 22 and 23, respectively, are rotatably supported thereon. The rollers 22 and 23 are somewhat elongated, and comprise an outer surface formed of hard rubber, and a metallic bearing surface, said outer rubber surface being designated by the reference characters 24—24, and the bearing surface by the reference characters 25—25.

The said rollers are journaled on intermediate portions of the arms, and are adapted to rotate thereon between stops 27—27 fixed to the respective arms as at 28—28 and the enlarged portions 29—29 formed on the respective collars. The arms 16 and 17 have the thickened portion 29 formed thereon, spaced inwardly from the free end of the arm as illustrated to advantage in Figure 6. On the free ends of each of the arms is rotatably mounted a roller 30—30, and each of these rollers are somewhat smaller in contrast to the first mentioned rollers, but are likewise provided with the outer hard rubber surface and the inner metallic bearing surface, the same as the rollers 22 and 23. The rollers 30—30 taper toward one edge thereof as at 31—31 to terminate at the extremity of the respective arms in a reduced portion 32—32. These last mentioned rollers are suitably held in place upon the arms by means of the wide portions 29 of the respective arms and a washer plate 33—33 secured to the extremities of the said arm through the medium of fastening screws 34—34.

It is to be noted that the arms 16 and 17 are so spaced from one another as to permit their extension between the flanges 5 and 7 of the film reel whereby the rollers 30 carried on the arm may come into frictional contact with the respective flanges, and it is obvious that during the rotation of the reel any bent portions, or irregularities in the respective flanges will be prevented from coming into contact with the film 7, since it is apparent that the flanges will be forced outwardly and away from the edges of the film due to the action of the rollers upon the respective flanges.

Rotatably mounted between the arms 16 and 17 is a relatively large roller 35. The roller 35 also comprises an outer surface 36 formed of relatively hard rubber, and a metallic bearing surface 37. A two part axle is fixed between the arms 16 and 17, and it is upon this axle that the roller 35 is journaled. This two part axle comprises the member 40 having the projection 41 extending axially therefrom to be received in a slot 38 formed in the portion 29 of the arm 16. The projection 41 is fixed within the slot 38 as at 39. The member 40' of the said two part axle is somewhat smaller than the member 36 and is also provided with the axially extending projection 41' adapted to be received in the slot 38 of the arm 17, and is fixed therein as at 42.

It is to be understood of course that the slots in the respective arms are in alinement so as to permit interconnection between the two parts of the axle in the manner to be herein presently described. The inner face of the axle member 40' is provided with a socket 42, from which socket portion extends a stem 43, said stem being slidably received in a bore 44 centrally disposed and extending longitudinally of the axle member 40. A spring 45 is coiled about the stem 43 and one end of the spring is received within the socket 42, while the other end of the spring is adapted to bear against the inner face of the axle member 40 as illustrated. In this manner there is also provided a resilient connection between the arms 16 and 17 as is obvious.

Any suitable attaching member 46, may be secured to the bar 13 as at 47, intermediate the ends of the bar 13 and the opposite ends of this attaching member 46 is pivotally mounted as at 47 between the arms 48 of a bracket 49 secured to one wall of the housing A as at 50.

As shown in Figures 1 and 2, when the device is pivotally mounted within the housing, so as to be disposed in opposite relation with respect to the film wheel 5 it will be seen that the roller 35 is adapted to bear upon the film 7 as it is unwound upon the reel, and the rollers 30 will be disposed between the flanges 6 and 7 of the film reel against the same whereupon the flanges are kept out of contact with the marginal edges of the film during the unwinding process.

It will be noted that as the film unwinds, the device will move upon its pivotal point in accordance therewith, so that as it assumes a position as shown in dotted lines in Figure 1 the rollers 22 and 23 will also be brought into contact with the respective flanges to operate thereupon in the same manner as the rollers 30. It is also to be noted that the rollers are kept in constant contact with the flanges, since it is obvious that the spring 45 will normally hold the axle parts 36 and 40 in spaced relation whereby to compensate for any variance in the distance between the flanges due to any disfiguration or bending of the flanges during transportation of the reel, as is very often the case.

From the foregoing then it will be seen that we have provided a simple and efficient device for holding the flanges of a film wheel out of contact with the film thereby preventing any disfiguration of the film due to any distortion of the flanges.

While we have herein shown and described certain detail structural elements of our invention, it is to be understood that the invention comprehends certain changes to be made therein without departing from the spirit of the invention as hereinafter described, or the scope of the appended claims.

Having thus described the invention, what we claim as new and desire to secure by Letters Patent is:—

1. In a device of the character described, the combination of a reel embodying flanges, a pair of rollers, means for supporting the rollers in operative relation with respect to said reel, and said rollers adapted to extend between the flanges of the reel, a relatively large roller rotatably disposed between the first mentioned rollers, and resilient means for urging the first mentioned rollers against the adjacent flanges of the reel.

2. In a device of the character described, the combination of a flanged film reel having a film wound thereon, of a plurality of rollers, means for mounting said rollers in operative relation with respect to the film reel, said rollers being arranged in pairs, and each roller of said pair adapted to contact with the flange of the reel during rotation of the reel, a relatively large roller rotatably mounted between the respective pairs, and said last mentioned roller adapted to rest upon the film during the unwinding thereof.

3. In a device of the character described, a frame comprising a pair of spaced parallel arms, a pair of spaced rollers rotatably mounted on each of said arms, and the rollers of each pair being adapted to contact with the flanges of a reel, a resilient connecting means for the arms adjacent their free ends, and a roller supported by the connecting means and adapted to rest upon the material carried by the reel.

4. In a device of the character described, a supporting means, a bar, means for pivotally mounting the bar on a supporting means, a pair of spaced parallel arms extending from the bar, a pair of spaced rollers rotatably carried by each of said arms, means for holding the rollers in spaced relation upon each of said arms, and each of said rollers adapted to contact with a reel flange for spreading the flanges apart, means for normally urging the roller in contact with the respective flanges, and a roller rotatably mounted between the arms and adapted to rest upon the material carried by the reel.

5. In a device of the character described, an elongated bar, means for pivotally mounting the bar, a pair of arms disposed in spaced parallelism carried by the bar, a pair of spaced rollers carried by each of said arms, each roller of said pair being adapted to contact with the flange of a reel, an axle member carried by each of said arms, one of said axle members being provided with a bore, and the other of said axle members having a stem extending therefrom and receivable in said bore, a coil spring normally urging the axle members apart, and a roller rotatably carried by the axle member and adapted for rest upon the material carried by the reel.

In testimony whereof we affix our signatures.

KENNETH C. HAMER.
CLARK W. RODGERS.